May 31, 1927.
I. J. DAVIS
1,630,658
LICENSE PLATE HOLDER
Filed March 4, 1927
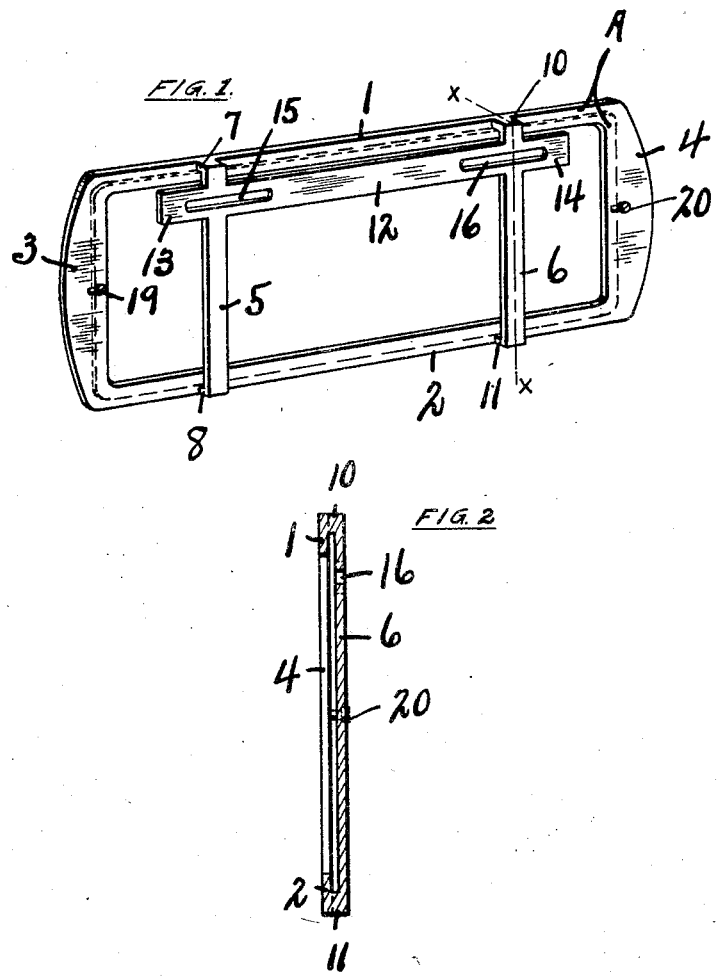
INVENTOR
Irving J. Davis
BY Lewison Thompson
ATTORNEYS Patented May 31, 1927.

1,630,658

UNITED STATES PATENT OFFICE.

IRVING J. DAVIS, OF SYRACUSE, NEW YORK.

LICENSE-PLATE HOLDER.

Application filed March 4, 1927. Serial No. 172,630.

This invention relates to a certain new and improved license plate holder.

The main object of the invention is the provision of a comparatively simple, rigid and permanent structure for supporting and holding the license plate of an automobile.

A further object resides in the fact that the license plate holder of this invention is adapted to be secured to any of the ordinary supports provided at present on automobiles for that purpose.

Other objects and advantages relate to the details of the structure, form and relation of the parts thereof, all as will more fully appear from the following description taken in connection with the accompanying drawings in which:—

Figure 1 is a perspective view of a license plate holder of this invention indicating the usual license plate in dotted lines.

Figure 2 is a section on line $x$—$x$, Figure 1.

The license plate holder of this invention comprises a front rim or frame A formed of integrally connected upper and lower horizontal bars —1— and —2— respectively, and opposite end bars —3— and —4— respectively connecting the upper and lower horizontal bars together at their opposite ends to leave a central opening slightly wider and slightly longer than the width and length respectively of the usual license plate.

In addition the upper horizontal bar —1— is connected to the lower horizontal bar —2— by two vertical bars —5— and —6— respectively arranged symmetrically with respect to the frame A, the bar —5— crossing the opening in the frame A near one of its ends and the bar —6— crossing the opening in the frame A near its other end. The bar —5— is connected to the upper bar —1— and the lower bar —2— of the frame by legs —7— and —8— respectively of a height sufficient to space the bar —5— from the frame A a distance substantially equal to the thickness of the ordinary license plate so that the license plate can be slid endwise between the bar —5— and the frame A, but will be confined between the bar —5— and that portion of the bar —1— below the leg —7— and that portion of the bar —2— above the leg —8—.

These legs are integrally connected to the frame A and the leg —8— is formed at the upper portion of the bar —1— and is of less thickness than the width of the bar —1— while the leg —8— is connected to the lower edge of the bar —2— and is of less thickness than the width of the bar —2—.

In like manner the bar —6— is integrally connected to and spaced from the frame A by legs —10— and —11—, the leg —10— being integral with the upper portion of the bar —1— and being of less thickness than the width of the bar, while the leg —11— is connected to the lower portion of the bar —2— and is of less thickness than the bar to thereby form channels between the bars —1— and —2— and the bars —5— and —6— in which the opposite edges of the license plate may slide, and are then confined while the central portion of the license plate containing the numbers, etc. is exposed through the central opening in the frame A.

The bars —5— and —6— are connected near their upper portions by a horizontally extending integral cross-bar —12— which extends between the bars —5— and —6— and projects at —13— horizontally from the bar —5— on the side opposite the bar —6— and in a symmetrical manner projects at —14— from the side of the bar —6— opposite the bar —5—.

The bar —12— is formed with two elongated slots —15— and —16—, which slots extend from the central portion of the bar —12— outwardly through the respective posts —5— and —6— and some distance into the projections —13— and —14— to provide passageways for bolts adapted to be mounted on supports of different width as ordinarily provided upon automobiles.

In order to rigidly confine the license plate shown in dotted lines at —18—, Figure 1, the end walls —3— and —4— are provided with threaded openings spaced apart a distance equal to the length of the license plate and screws —19— and —20— are provided, each having heads so that when the screws are threaded into the respective openings —3— and —4—, the opposite edges of the license plate will substantially contact with the body of the screws and will lie under the respective heads whereby the license plate is secured against sliding movement between the frame A and the upright bars —5— and —6—.

Although I have shown and described a specific construction of license plate holder, I do not desire to restrict myself to the details of the same, as various changes and modifications will be made within the scope of the appended claims.

I claim:

1. A license plate holder for automobiles comprising an integral frame formed of two elongated horizontal bars connected at their ends by vertical bars to form a rectangular frame having an opening adapted to disclose the body portion of a license plate, a pair of vertical bars traversing the opening in the frame near its opposite ends, and integrally connected to and spaced from the frame by comparatively short legs to permit a license plate to be slid between the frame and the vertical bars, and a horizontal bar connecting the vertical bars near their upper ends and projecting to opposite sides of the vertical bars, and formed with a pair of slots, each slot intersecting one of the vertical bars, and means connected to the end bars of the frame for limiting horizontal movement of a license plate.

2. A license plate holder for automobiles comprising an integral frame formed of two elongated horizontal bars connected at their ends by vertical bars to form a rectangular frame having an opening adapted to disclose the body portion of a license plate, a pair of vertical bars traversing the opening in the frame near its opposite ends, and integrally connected to and spaced from the frame by comparatively short legs to permit a license plate to be slid between the frame and the vertical bars, and a horizontal bar connecting the vertical bars near their upper ends and projecting to opposite sides of the vertical bars and formed with a pair of slots, each slot intersecting one of the vertical bars, the end bars of the frame being each provided with a threaded opening, said openings being spaced apart a distance substantially equal to the length of a license plate, and headed members threaded into said openings and having their head portions adapted to overlie a license plate slid between the frame and the said vertical bars.

In witness whereof I have hereunto set my hand this 25th day of February, 1927.

IRVING J. DAVIS.